United States Patent
Arditi (10) Patent No.: US 8,922,061 B2
(45) Date of Patent: Dec. 30, 2014

(54) SYSTEMS AND METHODS FOR DETECTING AND CORRECTING A SUBOPTIMAL OPERATION OF ONE OR MORE INVERTERS IN A MULTI-INVERTER SYSTEM

(75) Inventor: Sam Arditi, Los Gatos, CA (US)

(73) Assignee: Tigo Energy, Inc., Los Gatos, CA (US)

(*) Notice: Subject to any disclaimer, the term of this patent is extended or adjusted under 35 U.S.C. 154(b) by 450 days.

(21) Appl. No.: 12/840,228

(22) Filed: Jul. 20, 2010

(65) Prior Publication Data

US 2011/0227411 A1   Sep. 22, 2011

Related U.S. Application Data

(60) Provisional application No. 61/340,841, filed on Mar. 22, 2010, provisional application No. 61/395,848, filed on May 17, 2010.

(51) Int. Cl.
H02J 1/00 (2006.01)
H02J 7/00 (2006.01)

(52) U.S. Cl.
CPC .............. *H02J 7/0044* (2013.01); *Y10S 136/29* (2013.01); *Y10S 136/293* (2013.01)
USPC .................... 307/82; 307/18; 307/43; 361/18; 136/244; 136/290; 136/293

(58) Field of Classification Search
CPC .............. H02J 1/10; H02J 1/102; Y02E 10/50
USPC ........... 307/18, 82, 43; 361/18; 136/290, 293, 136/244
See application file for complete search history.

(56) References Cited

U.S. PATENT DOCUMENTS

| | | | |
|---|---|---|---|
| 5,235,266 A | 8/1993 | Schaffrin | |
| 5,268,832 A | 12/1993 | Kandatsu | |
| 5,566,022 A | 10/1996 | Segev | |
| 5,604,430 A | 2/1997 | Decker et al. | |
| 5,747,967 A * | 5/1998 | Muljadi et al. | 320/148 |
| 5,923,158 A | 7/1999 | Kurokami et al. | |

(Continued)

FOREIGN PATENT DOCUMENTS

| | | |
|---|---|---|
| AU | 2005262278 | 7/2005 |
| DE | 4232356 | 3/1994 |

(Continued)

OTHER PUBLICATIONS

International Patent Application No. PCT/US2011/029392, International Search Report and Written Opinion, Oct. 24, 2011.

(Continued)

*Primary Examiner* — Jared Fureman
*Assistant Examiner* — Alfonso Perez Borroto
(74) *Attorney, Agent, or Firm* — Greenberg Traurig LLP (57) ABSTRACT

Provided is a system and method for detecting and correcting a suboptimal operation of one or more maximum power point tracking (MPPT) devices in a solar photovoltaic power generation (SPVPG) system. MPPT devices may become stuck in a local maximum in a power curve and fail to reach an optimal maximum power point. Described herein are methods and systems for detecting sub-optimal performance of an MPPT device and managing components within the SPVPG system to cause the MPPT device to track a different maximum power point.

20 Claims, 4 Drawing Sheets

(56) References Cited

U.S. PATENT DOCUMENTS

| | | |
|---|---|---|
| 6,275,016 B1 | 8/2001 | Ivanov |
| 6,448,489 B2 | 9/2002 | Kimura et al. |
| 6,650,031 B1 | 11/2003 | Goldack |
| 6,844,739 B2 | 1/2005 | Kasai et al. |
| 6,894,911 B2 | 5/2005 | Telefus et al. |
| 6,984,970 B2 | 1/2006 | Capel |
| 7,061,214 B2 | 6/2006 | Mayega |
| 7,248,946 B2 | 7/2007 | Bashaw et al. |
| 7,256,566 B2 | 8/2007 | Bhavaraju et al. |
| 7,276,886 B2 | 10/2007 | Kinder |
| 7,518,346 B2 | 4/2009 | Prexl |
| 7,595,616 B2 | 9/2009 | Prexl |
| 7,605,498 B2 | 10/2009 | Ledenev et al. |
| 7,719,140 B2 | 5/2010 | Ledenev et al. |
| 8,138,631 B2 * | 3/2012 | Allen et al. .............. 307/82 |
| 8,384,243 B2 * | 2/2013 | Adest et al. .............. 307/43 |
| 8,509,032 B2 | 8/2013 | Rakib |
| 2005/0057214 A1 | 3/2005 | Matan |
| 2005/0057215 A1 | 3/2005 | Matan |
| 2005/0105224 A1 * | 5/2005 | Nishi ..................... 361/18 |
| 2005/0162018 A1 | 7/2005 | Realmuto et al. |
| 2006/0001406 A1 | 1/2006 | Matan |
| 2006/0162772 A1 * | 7/2006 | Presher et al. ........... 136/290 |
| 2006/0174939 A1 | 8/2006 | Matan |
| 2006/0185727 A1 | 8/2006 | Matan |
| 2006/0225781 A1 | 10/2006 | Locher |
| 2007/0027644 A1 | 2/2007 | Bettenwort et al. |
| 2007/0107767 A1 | 5/2007 | Hayden et al. |
| 2007/0176767 A1 | 8/2007 | Baumgaertner et al. |
| 2007/0235071 A1 * | 10/2007 | Work et al. ............. 136/244 |
| 2007/0273351 A1 | 11/2007 | Matan |
| 2008/0121272 A1 | 5/2008 | Besser et al. |
| 2008/0122449 A1 | 5/2008 | Besser et al. |
| 2008/0122518 A1 | 5/2008 | Besser et al. |
| 2008/0179949 A1 | 7/2008 | Besser et al. |
| 2008/0191560 A1 | 8/2008 | Besser et al. |
| 2008/0191675 A1 | 8/2008 | Besser et al. |
| 2008/0207357 A1 | 8/2008 | Savarese et al. |
| 2008/0236648 A1 * | 10/2008 | Klein et al. ............. 136/244 |
| 2008/0238195 A1 * | 10/2008 | Shaver et al. ............. 307/18 |
| 2008/0303503 A1 | 12/2008 | Wolfs |
| 2009/0206666 A1 * | 8/2009 | Sella et al. .............. 307/43 |
| 2010/0026097 A1 | 2/2010 | Avrutsky et al. |
| 2010/0043868 A1 * | 2/2010 | Sun et al. ............... 136/251 |
| 2010/0133911 A1 * | 6/2010 | Williams et al. ........... 307/82 |
| 2011/0132424 A1 | 6/2011 | Rakib |
| 2011/0245989 A1 | 10/2011 | Makhota et al. |
| 2012/0042588 A1 * | 2/2012 | Erickson, Jr. ............ 52/173.3 |

FOREIGN PATENT DOCUMENTS

| | | |
|---|---|---|
| DE | 19961705 | 7/2001 |
| EP | 1388774 | 2/2004 |
| ES | 2249147 | 3/2006 |
| JP | 2001060120 | 3/2001 |
| JP | 2001075662 | 3/2001 |
| JP | 2005251039 | 9/2005 |
| WO | 03012569 | 2/2003 |

OTHER PUBLICATIONS

Alonso, R. et al., "A New Distributed Converter Interface for PV Panels," 20th European Photovoltaic Solar Energy Conference, Barcelona, Spain, pp. 2288-2291, Jun. 6-10, 2005.

Alonso, R. et al., "Experimental Results of Intelligent PV Module for Grid-Connected PV Systems," 21st European Photovoltaic Solar Energy Conference, Dresden, Germany, pp. 2297-2300, Sep. 4-8, 2006.

Basso, Tim, "IEEE Standard for Interrconnecting Distributed Resources With the Electric Power System," IEEE PES Meeting, Jun. 9, 2004.

Boostbuck.com, "The Four Boostbuck Topologies," located at http://www.boostbuck.com/TheFourTopologies.html, 2003.

Enslin, Johan H.R., et al., "Integrated Photovoltaic Maximum Power Point Tracking Converter," IEEE Transactions on Industrial Electronices, vol. 44, No. 6, pp. 769-773, Dec. 1997.

Gautam, Nalin K. et al., "An Efficient Algorithm to Simulate the Electrical Performance of Solar Photovoltaic Arrays," Energy, vol. 27, No. 4, pp. 347-361, 2002.

Linares, Leonor et al., "Improved Energy Capture in Series String Photovoltaics via Smart Distributed Power Electronics," 24th Annual IEEE Applied Power Electronics Conference and Exposition, pp. 904-910, Feb. 15, 2009.

Nordmann, T. et al., "Performance of PV Systems Under Real Conditions," European Workshop on Life Cycle Analysis and Recycling of Solar Modules, The "Waste" Challenge, Brussels, Belgium, Mar. 18-19, 2004.

Palma, L. et al., "A Modular Fuel Cell, Modular DC-DC Converter Concept for High Performance and Enhanced Reliability," 38th IEEE Power Electronics Specialists Conference (PESC'07), pp. 2633-2638, Jun. 17, 2007.

Quaschning, V. et al., "Cost Effectiveness of Shadow Tolerant Photovoltaic Systems," Euronsun 96, pp. 819-824, Sep. 16, 1996.

Roman, Eduardo, et al., "Intelligent PV Module for Grid-Connectred PV Systems," IEEE Transactions on Industrial Electronics, vol. 53, No. 4, pp. 1066-1073, Aug. 2006.

Uriarte, S. et al., "Energy Integrated Management System for PV Applications," 20th European Photovoltaic Solar Energy Conference, Jun. 6, 2005.

Walker, G. R. et al., "Cascaded DC-DC Converter Connection of Photovoltaic Modules," 33rd IEEE Power Electronics Specialists Conference (PESC'02), vol. 1, pp. 24-29, 2002.

Walker, Geoffrey R. et al., "Cascaded DC-DC Converter Connection of Photovoltaic Modules," IEEE Transactions on Power Electronics, vol. 19, No. 4, pp. 1130-1139, Jul. 2004.

* cited by examiner

SYSTEMS AND METHODS FOR DETECTING AND CORRECTING A SUBOPTIMAL OPERATION OF ONE OR MORE INVERTERS IN A MULTI-INVERTER SYSTEM

CROSS-REFERENCE TO RELATED APPLICATIONS

The present application claims the benefit of Provisional U.S. Application Ser. No. 61/340,841, filed Mar. 22, 2010 and entitled "System and Method for Detecting and Correcting a Suboptimal Operation of One or More Inverters in a Multi inverter System" and of Provisional U.S. Application Ser. No. 61/395,848 filed May 17, 2010 and also entitled "System and Method for Detecting and Correcting a Suboptimal Operation of One or More Inverters in a Multi inverter System", the disclosures of which are incorporated herein by reference.

FIELD OF THE TECHNOLOGY

At least some embodiments of this disclosure relate to photovoltaic systems in general, and more particularly but not limited to, enhancing the performance of photovoltaic systems.

BACKGROUND

Solar photovoltaic power generation ("SPVPG") systems may include a number of maximum power point tracking devices. For example, a SPVPG may utilize a number of grid-connected inverters to supply electricity to an alternating current (AC) utility power grid, and an inverter may include a maximum power point (MPP) tracker configured to operate the set of photovoltaic panels supplying electricity to the inverter at a maximum power point.

SUMMARY OF THE DESCRIPTION

Systems and methods to enhance the performance of a photovoltaic system in accordance with the present disclosure are described herein. Some embodiments are summarized in this section.

In one aspect, the disclosure describes a method that includes receiving first power output information from a maximum power point tracking (MPPT) device configured to track a maximum power point of a solar power production system; wherein the solar power production system contains a plurality of direct current (DC) to DC converting devices each connected with at least one of a plurality of solar panel units within the solar power production system. The method further includes making a determination, from the first power output information, that the MPPT device has been operating the solar power production system at a first state for a predetermined period of time, the first state being sub-optimal for the solar power production system. The method further includes, transmitting, based on the determination, a first instruction to a first device, selected from the group consisting of the MPPT device and the plurality of DC to DC converting devices, to change a control operation of the first device.

In another aspect, the disclosure describes a solar photovoltaic power generation system, including a plurality of photovoltaic panels, and a plurality of direct current (DC) to DC converting devices each configured to adjust an output of a corresponding panel of the plurality of photovoltaic panels. The system further includes a maximum power point tracking (MPPT) device adapted to control the plurality of photovoltaic panels and a master management unit (MMU) adapted to receive information about a power output of the plurality of photovoltaic panels, to make a determination, based on the information, that the MPPT device has been operating the plurality of photovoltaic panels in a sub-optimal state for a period of time, and to instruct a first device, selected from the group consisting of the MPPT device and the DC to DC converting devices to change a control operation of the first device, based on the determination about the MPPT device.

In another aspect, the disclosure describes an apparatus adapted to control a solar power production system, with the apparatus including a memory to store a first executable program, a microprocessor to execute the first executable program, and a communications device coupled to the microprocessor to receive first power output information from a maximum power point tracking (MPPT) device configured to track a maximum power point of the solar power production system, wherein the solar power production system contains a plurality of direct current (DC) to DC converting devices each connected with at least one of a plurality of solar panel units within the solar power production system. Furthermore, the microprocessor is adapted to make a determination in accordance with the first executable program, from the first power output information, that the MPPT device has been operating the solar power production system at a first state for a predetermined period of time, the first state being sub-optimal for the solar power production system. Furthermore, the communications device is adapted to transmit, in response to the determination, a first instruction to a first device, selected from the plurality of DC to DC converting devices, to change a control operation of the first device.

Other embodiments and features of the present disclosure will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Provided is a system and method for detecting and correcting a suboptimal operation of one or more maximum power point tracking (MPPT) devices in a solar photovoltaic power generation (SPVPG) system. A MPPT device may track a sub-optimal maximum point of a photovoltaic system or sub-system controlled by the MPPT device. Described herein are methods and systems for detecting sub-optimal performance of an MPPT device and managing components within the SPVPG system to cause the MPPT device to track a different power point.

The SPVPG system may include inverters, such as, for example, a grid-tied inverter as is described in U.S. patent application Ser. No. 11/875,799, published now as U.S. Patent Application Publication No. 2008/0097655. As another example, the inverter may be used as a load to connect to the solar power generated by a photovoltaic panel, as described in U.S. patent application Ser. No. 12/366,597, published now as U.S. Patent Application Publication No. 2009/0133736. As another example, the performance of an inverter or multiple inverters can be optimized, wherein a number of inverters are used in a large system, or the inverters may be connected to a string bus, as described in U.S. patent application Ser. No. 12/411,317, now issued as U.S. Pat. No. 7,602,080. The contents of the above-discussed patent and publications are incorporated herein by reference.

Figure 1:
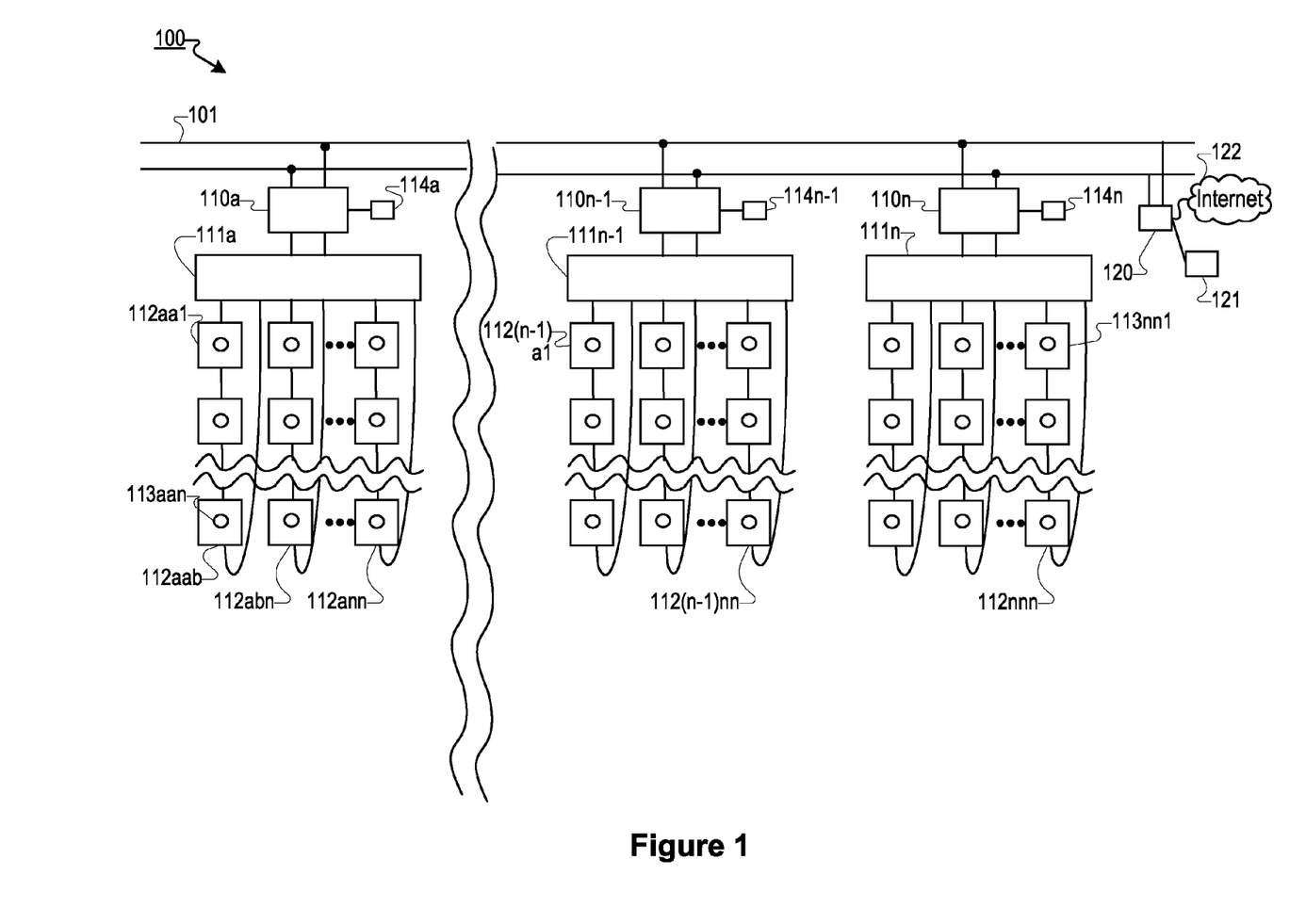
FIG. 1 shows an exemplary SPVPG system with a number of inverters, according to an embodiment of the present disclosure.

FIG. 1 shows an exemplary SPVPG system with a number of inverters, according to an embodiment of the present disclosure. The SPVPG system 100 includes connection to an alternating current (AC) grid 101 and multiple inverters 110$a$-$n$ adapted to invert direct current (DC) from combiner boxes 111$a$-111$n$ into AC for delivery to the AC grid. Each of the inverters 110$a$-$n$ may have its own communication interface 114$a$-$n$ adapted for communicating information relating to the operations of the inverter to, for example, the master management unit (MMU) 120, other portions of the SPVPG system and/or the Internet 122. The SPVPG system generates power via solar (e.g., photovoltaic or PV) panels 112$aa$1-112$nnn$. Optionally each panel may include a local management unit (LMU) 113$aa$1-113$nnn$. The SPVPG system may include a master management unit (MMU) 120, which may contain an MMU software instance 121, either or both of which may also be coupled or connected to the Internet 122. In this description, the Internet 122 is used as an exemplary communications network and another network may also be used alone or in combination such as, for example, a wired network, power-line network, radio, wireless, 802.11 network, infrared network, ultrasound network, etc.

While communication interfaces 114$a$-$n$ are shown for each inverter, it should be understood that other configurations are possible, including using multiple connections and communications protocols to allow the components of the SPVPG system 100 to communicate with one another. Exemplary communications between components of the SPVPG system 100 include transmitting and receiving operational data, as well as transmitting, receiving, and confirming commands. Any suitable network technology or combination of network technologies may be used including, but not limited to, wired, over power lines, wireless radio, radio, wireless, 802.11, infrared, ultrasound, etc., and each with its multiple variations of protocols.

In one embodiment, the MMU 120 is in communication with the SPVPG system 100 and receives data from components of the SPVPG system, whether in response to a specific request or as part of a polling/reporting protocol. In one embodiment, more than one MMU 120 may be present (e.g., in very large systems), and each of the MMUs 120 may be networked directly to one another, or via the Internet 122 or other network connections, if present, or both. The MMU 120 may issue commands to control each of the LMUs 113$aaa$-113$nnn$ through the communications channels with the SPVPG system components.

LMUs 113 may connect the PV panels 112 in a SPVPG system 100 in many different ways. In one embodiment, particularly in system configurations utilizing serial connections, each panel 112 has an LMU 113 which connects the corresponding panel 112 to a series power bus (e.g., a string of LMUs). The LMU 113 may be used to monitor and control the power output from the corresponding panel 112. For example, the LMU 113 may contain circuitry to measure various operating parameters (such as power output, temperature, voltage, current) of the respective solar panel unit(s) and may connect, disconnect and/or pulse-width modulate the power from the corresponding panel 112. An LMU 113 may contain a communicator or communications device to transmit the operating parameters and to receive instructions, for example, from an MMU 120 or other controller. In one embodiment, particularly in system configurations utilizing parallel connections, an LMU 113 may contain a DC to DC step-up converting device for connecting the solar panel unit(s) monitored and controlled by the LMU to a parallel bus. In one embodiment, the LMU 113 may contain an MPPT device and/or may perform MPP tracking functions. In another embodiment, the LMU 113 may communicate with another controller, such as the MMU 120, to allow the other controller to monitor and instruct the LMU to adjust the operation point of the corresponding PV panel 112 (e.g., to track the MPP). For example, the LMU 113 may communicate operational parameters to an MMU 120 that may select or compute an operation point for the LMU 113 and/or perform the MPP tracking functions (e.g., via instructing the LMU to adjust how the solar panel unit(s) are operated to track the MPP of the solar panel unit(s)). Various configurations and functions of the LMUs are described in the disclosures of U.S. patent application Ser. Nos. 12/392,042, 12/612, 641, and 12/411,317 (now issued as U.S. Pat. No. 7,602,080), each of which is incorporated by reference.

An SPVPG system 100 may be arranged differently in many possible embodiments of varied complexity and size. FIG. 1 indicates this exemplary range of possible complexities and sizes of the SPVPG system 100 via vertical interruption lines, horizontal interruption lines and through ellipsis. The exemplary SPVPG system 100 is arranged using strings of panels 112. An exemplary string of panels is the string on the left of FIG. 1, namely panels 112$aa$1-112$aab$.

In one embodiment, a string local management unit (SLMU) is used to control the output of an individual string and some SPVPG systems may include an SLMU for each string. In one embodiment, the SLMU(s) may be contained within the combiner box 111. In one embodiment, the SLMU may be contained separately from the combiner box 111. In one embodiment, the SLMU includes a DC to DC converting device to convert the DC voltage of a string to a parallel bus DC voltage before it is combined by the combiner box 111. The DC to DC conversion may be performed by the DC to DC converting device contained in an SLMU based on communication with the MMU 120. Alternatively, the SLMU may include a stand-alone DC to DC converting device. Configurations of SLMUs, combiner boxes, panels and strings of panels are described in U.S. patent application Ser. Nos. 12/691,692, 12/628,977, and 12/612,641, the disclosures of which are incorporated by reference.

After conversion of the DC voltage of each string to a DC voltage compatible with the parallel bus, there may be several strings of panels 112 connected to a combiner box 111 that may connect each string in parallel to a single DC bus that is connected to an inverter 110. In some embodiments, SLMUs are not used. The inverter 110 connects to the DC bus from the combiner box 111 and to the AC grid 101, inverting the power received from the DC bus into alternating current for placement onto the AC grid.

The operations of maximum power point (MPP) tracking may be performed by several types of components in a SPVPG system, and these components may be broadly referred to as maximum power point tracking (MPPT) devices to describe their function of performing MPP tracking, regardless of any other functions the components may perform in the SPVPG system. In some instances, an MPPT device may be simply referred to as an inverter due to the presence of MPPT devices and/or functionality present in inverters. However, this description should not limit the understanding from this disclosure that inverters are one of several types of components that may include MPPT devices and/or functionality. For example, LMU devices may contain MPPT devices and/or functionality.

Different variations of elements of the SPVPG systems and components are known in the art, and some are discussed in copending applications, including, for example, U.S. patent application Ser. No. 12/411,317, now issued as U.S. Pat. No. 7,602,080, U.S. Provisional Application Ser. No. 61/335,566, and U.S. application Ser. Nos. 12/612,641 and 12/628,977, the disclosures of which are incorporated herein by reference. For example, in one embodiment, each photovoltaic panel 112*aa*1-112*nnn* may have its own LMU 113. In another embodiment, each string of panels (e.g., 112*aa*1-112*aab*) may have a single LMU associated with the string, namely a string local management unit (SLMU), at its end controlling the string of panels. In another embodiment, an LMU may be configured to control the operation of a different grouping of multiple panels 112. In addition, any SPVPG system 100 may include different and varied distributions of LMUs 113 throughout the system. In one embodiment, each of the strings connected to the combiner box (e.g., 111*a*) has only one panel. In one embodiment, each of the strings connected to the combiner box (e.g., 111*a*) has a plurality of panels connected in series. In one embodiment, a single string of panels (e.g., 112*aa*1-*n*) is connected directly to the inverter 110*a* without the combiner box (e.g., 111*a*) (and the other strings).

Figure 2:
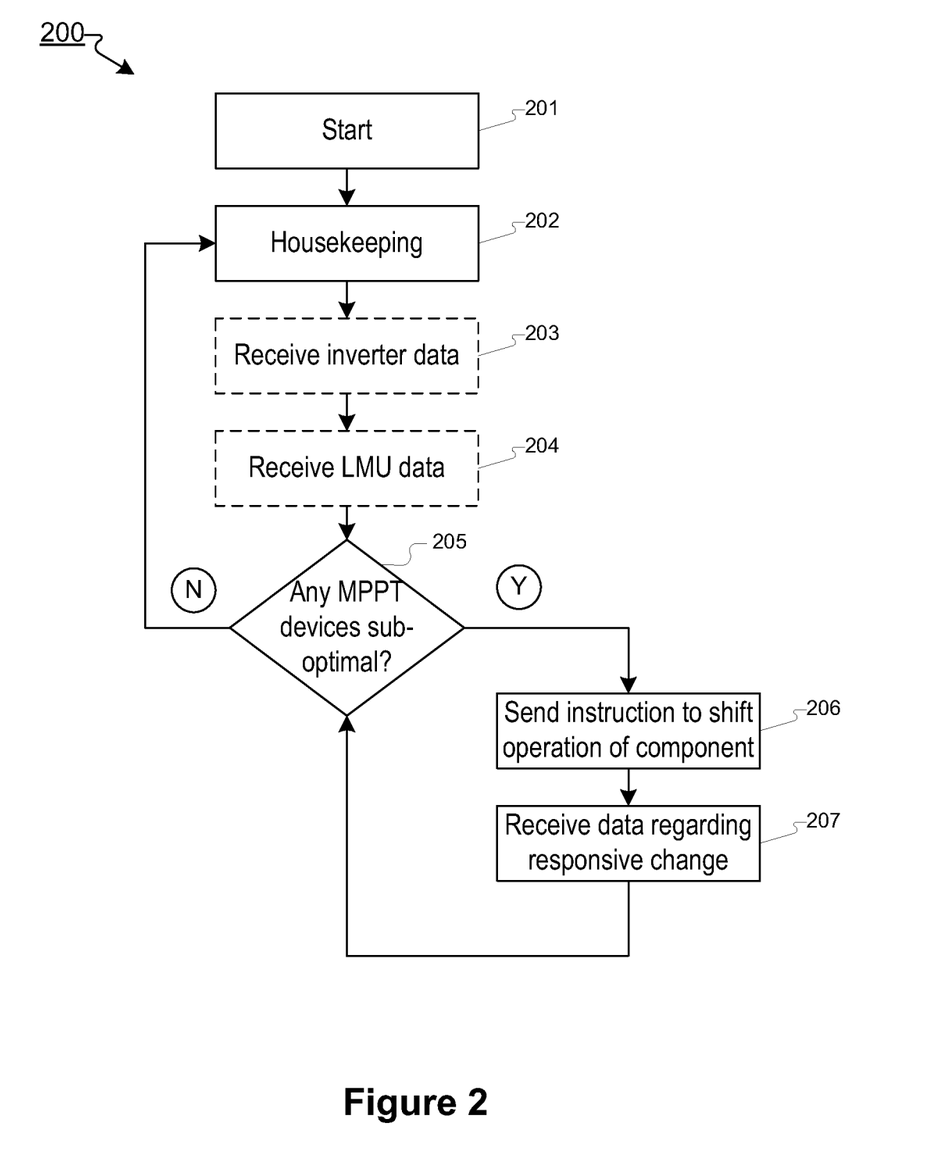
FIG. 2 shows an exemplary flowchart of a process for controlling the performance of a SPVPG system.

FIG. 2 shows an exemplary flowchart of a process 200 for controlling the performance of a SPVPG system. In one embodiment, the process 200 may be performed by an MMU connected with the SPVPG system, which may be just one MMU of a large system. In another embodiment, the process 200 may be implemented in an MMU software instance and/or through multiple MMUs/software instances in a system. In another embodiment, the process 200 may be performed by a part of the SPVPG system that is not an MMU.

The process 200 starts in step 201 and "housekeeping" may be performed in step 202, which may include performing management functions and interactions between the components in the SPVPG system. The process 200 then turns to receiving (steps 203-204) and making a determination(s) (step 205) from power output data from various components of the SPVPG system. Optionally, in one embodiment of the process 200, data from inverter(s) may be received in step 203, as described further herein with respect to communications between the components of the SPVPG system. Optionally, in another embodiment of the process 200, data from LMU(s) may be received in step 204. In another embodiment, data from one or more inverter(s), LMU(s) or other components of the SPVPG system may be received to determine the effectiveness of maximum power point (MPP) tracking operations performed by the component(s) in step 205.

The process 200 makes a determination in step 205 whether the MPP tracking operations of the components of the SPVPG system are likely to be operating in a sub-optimal state, based on the inverter data and/or the LMU data. The MPP tracking operations are designed to seek a maximum operational point for at least one solar panel monitored by an MPPT device. As further described in FIG. 3, the determination made in step 205 may include the analysis of the operational parameters of the system to determine whether it is likely the MPPT device is operating a panel or group of panels at a sub-optimal state.

As is known in the art, a MPPT device may be included in a converter, such as an inverter or a DC/DC converter, to present an optimal electrical load to a photovoltaic system that supplies electricity to the converter. In one embodiment, for example, the MPPT device is included in components of the system, such as an inverter, SLMU or LMU. As described further herein, the determination is made in step 205 whether the relevant MPPT device is operating sub-optimally.

In one embodiment, some of the converters in the system, such as the converters in the SLMUs and/or LMUs are controlled by the MMU, and the corresponding devices such as the SLMUs and the LMUs do not have their own tracker. The MMU computes the control parameters, such as duty cycles, for these converters. Other converters in the system, such as the converters in the inverters, have MPPT devices that track maximum power points autonomously. The MPPT operations of these devices are substantially independent from the MMU. In one embodiment, the MMU is to determine whether such autonomous MPPT devices are operating sub-optimally.

In one embodiment, the determination made in step 205 may including considering information from a nearby MPPT device that tracks the maximum power point of another system, or another section of the same system, that is adjacent or similar to (or same as) the section of the system monitored by the relevant MPPT device. By comparing devices that monitor adjacent systems or sections of systems, the operational power points may be compared to determine in step 205 whether one MPPT device is operating its panel(s) sub-optimally. In one embodiment, the system may not use the LMU data and/or may not have the LMUs, when the MMU can detect sub-optimal conditions via comparing the operations of multiple MPPT devices (e.g., the operation of the inverters).

In one embodiment, the LMU data is used to estimate an optimal operating point of the inverter, and the inverter data from the inverter containing the subject MPPT device is compared to the estimate to determine whether the MPPT device is at a sub-optimal maximum power point.

In another embodiment, the operating point of the subject MPPT device may be compared in the determining step 205 with non-current data, including historical data about the panels, system operations, and configuration of the system. In another embodiment, information may be considered in the determining step 205 about the current operating parameters of the system and/or adjacent or nearby sections of the system, including solar radiation on the system, heating of the system, and maintenance on the system.

In some embodiments, the configuration of the SPVPG system may not be known or may only be partially known, and the configuration and/or the status of particular components may be only partially known, possibly due to communication issues and/or different or mixed manufacturers of the components of the system. Where partial or incomplete information is known about the components of the system, the determination made in step 205 may include inferences, estimates and/or historical data as well as current information received from the components of the system.

Because the MPPT device is also performing an optimization operation (e.g., maximizing power output), the determination made in step 205 may set a predetermined time period for which the process 200 will allow the MPPT device to perform its optimization operation before determining in step 205 that the MPPT device is operating sub-optimally. Thus, the process 200 may delay completing the determination step 205 if it is apparent that the MPPT device may still be settling on what the MPPT device believes is the maximum power point, or optimal operational state for the panel or panels that the MPPT device is monitoring. In one embodiment, the MMU is to monitor the changes in the operating point of the MPPT device. After the MMU observes no change in the operating point of the MPPT device for a period of time (e.g., longer than an average or an expected time period for the MPPT device to make a change in operation point to track the MPP), the MMU determines that the MPPT will likely remain at that operating point. In one embodiment, the MPPT device explicitly informs the MMU that the MPPT device has reached an MMP. In one embodiment, the process 200 may determine as part of the step 205 that the MPPT device has settled on what it believes is a maximum power point without the process 200 determining in step 205 that a predetermined period of time has elapsed. For example, the process could determine in step 205 that the MPPT has settled on what it believes is the maximum power point through determining that the MPPT device has stopped seeking new operational parameters, or determining that the MPPT device has narrowed the range of operational parameters to a small range, predetermined by the process. After this predetermined time has elapsed, or the process otherwise determines in step 205 that the MPPT device has settled on an operational point, the determination may be made further in step 205 by the process whether the operational point chosen by the MPPT is likely to be sub-optimal.

If the process 200 determines in step 205 that the MPPT device(s) is/are likely to be operating optimally, the process returns to the housekeeping operations of step 202, the data receiving operations of steps 203 and 204 and, further, for new determinations made in step 205.

However, if the process 200 determines in step 205 that the MPPT device(s) is/are likely to be operating sub-optimally, the process moves to step 206, which includes sending instructions to components of the system to perform one or more operations that would influence the tracking operations of the relevant MPPT device. As described further herein, step 206 may include shutting off and restarting a converting device, disrupting the control functions of the converting device, instructing the converting device to perform an operation that makes the panel(s) under management operate further sub-optimally, and/or instructing another component of the system to create a disruption that causes the MPPT device to search for another maximum power point. Notably, step 206 may include sending an instruction to a component that does not contain the MPPT device, an instruction that may disrupt the operation of the component receiving the instruction, the MPPT device and/or other components in the system. For example, in one embodiment, the converting device that is instructed to change operation is in an LMU or SLMU. In another embodiment, the instruction is sent to the MPPT device, or the device that contains the MPPT device, such as an inverter.

For example, in one embodiment, the process 200 in MMU is to instruct in step 206 an LMU to pull or push more current onto or off of a serial bus of panels, thereby changing the current and voltage supplied to an inverter at the end of the string. In this embodiment, an MPPT device in the inverter may seek a new maximum power point and temporarily move the operational point along the operational power curves, as described further herein. In this embodiment, in step 207, data is received from an inverter that has had its current modified (e.g., the inverter whose LMU and its string has been modified) and from the received data a determination is made in step 205 whether the relevant MPPT is still operating sub-optimally. Based on this determination in step 205, as described further herein, the process 200 continues.

Other instructions may be sent in step 206 to shift the operation of a component of the system. For example, in one embodiment, an LMU for at least one panel may be shut down and restarted in step 206. The shut down and restart process performed as step 206 may include a delay based on a predetermined time period through which such shut down will affect the MPPT device. For example, the subject MPPT device may be at the end of a long string of panels and other LMUs within the string may react to one LMU being shut down. Therefore, the process 200 may include a delay in step 206 that allows the LMU shut down and restart process to effectively shift the operation of the MPPT device.

In addition, the step 205 may continually make determinations based on data received through steps 203, 204, and 207. Therefore, a first MPPT may be determined in step 204 to operate sub-optimally and the process 200 may enter steps 206 and 207 with respect to that first MPPT, while the process may continue making determinations and otherwise monitoring the other MPPT devices. As described further herein, the determination made in step 205 may take into account the known time frames for settling the MPP tracking operation and may delay actions such as completing a determination in step 205 and/or sending instructions in step 206 until after the relevant time frame has elapsed.

Figure 3A:
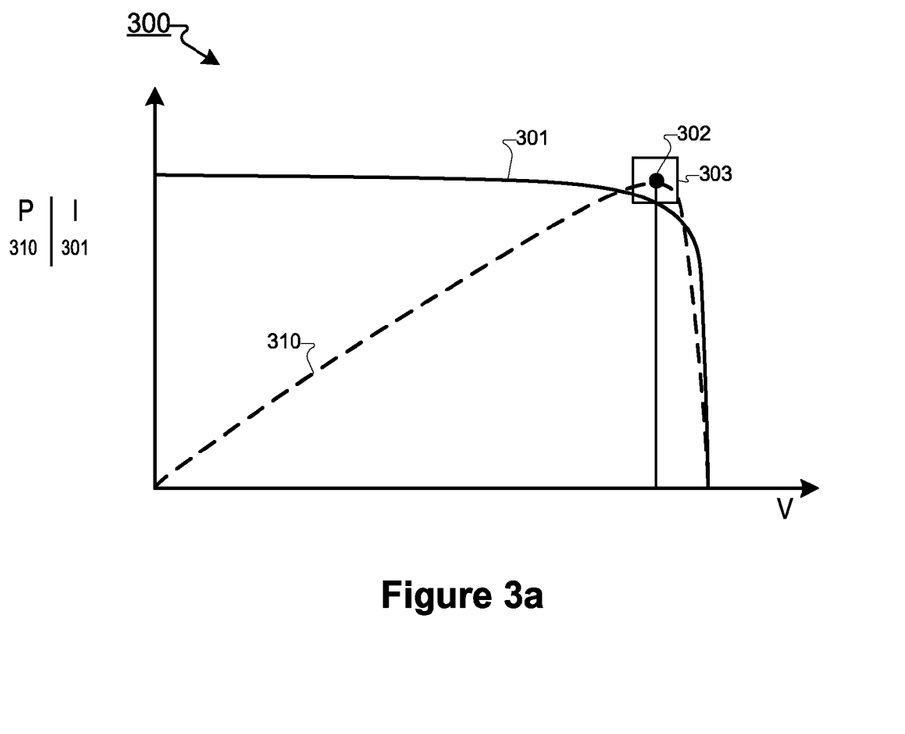
FIG. 3a illustrates a power versus voltage curve and current versus voltage curve of a photovoltaic system according to an embodiment of the disclosure.

FIG. 3*a* illustrates a power versus voltage curve and current versus voltage curve of a photovoltaic system according to an embodiment of the disclosure. Curve 301 shows current (I) (along vertical axis) versus voltage (V) (along horizontal axis) generated by a photovoltaic system. An MPPT device may adjust electrical loads to the photovoltaic system to operate the system at a particular point on the I-V curve 301. Curve 310 shows power (P) (along vertical axis) generated versus voltage for various operational voltage points corresponding to those on the curve 301. The MPPT device functions to operate the photovoltaic system at the maximum power point 302 on the power curve 310.

The exemplary current over voltage curve 301 is typical for a serial string of panels, and slowly slopes downwards with a slight decline. However, in practice, a configuration of one or more panel(s) may create a non-monotonous portion curve 310 due to a number of factors including individual panels having different individual I-V curves and different MPPs due to individual panel characteristics, various component tolerances, various LMU characteristics, partial shading of one or more panels caused by dust or dirt, and/or other factors. A large SPVPG system may include multiple configurations of solar panels and an MPPT device may monitor an undetermined configuration of panels. For example, an inverter may perform a single MPP tracking operation for an entire string of panels and a roughly equal current, as dictated by the inverter, may flow through all the photovoltaic panels coupled to a given string. The current may be optimal for one panel and not another, yet the MPPT device in the inverter may see the entire string as having a local maximum and non-monotonous portion leading to a global maximum. Therefore, in practice, the power curve 310 may have one or more non-monotonous portions surrounding the MPP 302, as shown generally in box 303 and as described further herein.

Figure 3B:
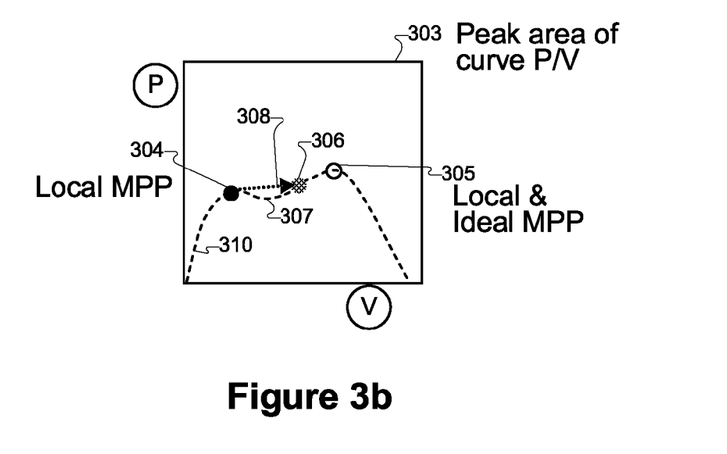
FIG. 3b illustrates a movement along the power curve to optimize performance of a photovoltaic system according to an embodiment of the present disclosure.

FIG. 3b illustrates a movement along the power curve to optimize performance of a photovoltaic system according to an embodiment of the present disclosure. Particularly, the curve shown is an expanded view of the portion of the P-V curve 310 of FIG. 3a as circumscribed by box 303. Specifically, FIG. 3b shows the one non-monotonous portion of the curve 310 with a local power maximum at point 304 in the curve 310 and another non-monotonous portion of the curve 310 with a local power maximum at point 305. The presence of multiple local maximum points 304 and 305 on the curve 310 may occur due to any of a number of configuration, tolerance, and environmental factors occurring in the SPVPG system as described further herein. An MPP tracking operation may become trapped at the local maximum power point 304, thus preventing it from proceeding to local maximum point 305, which also is the ideal or global maximum power point 305.

Factors leading to local MPPs, such as point 304, on non-monotonous portions of the curve 310 may be caused by static or transient component interactions within the system, variations over time of the performance of the panels (e.g., due to differential heating or shading of certain panels under management by an MPPT device) and/or operational variations of other components in the system. For example, a subset of the panels under management by an MPPT device may each operate consistently while another subset of the panels has its operational parameters change due, for instance, to a steep increase in shading.

In one embodiment, when the MMU determines that the MPPT device is thus operating sub-optimally, the MMU of the system instructs system components to perform operations that change the electricity generation for the MPPT device. This change in electricity generation operation typically causes the MPPT device to start searching for a maximum power point again. For example, the change may cause the MPPT device to go to a different operating point 306, as indicated by dotted direction arrow 308, and to search for a maximum power point. In FIG. 3b, because the operating point 306 is close to the local maximum power point 305, the MPPT device subsequently moves along the curve 310 toward the local (and ideal or global) MPP 305. Other examples include a power curve with multiple non-monotonous inversions 307 in the curve caused by complex system configurations, or other characteristics described further herein.

Additionally, the MPPT device may not move along the curve 310 continuously, depending on how the MPP tracking operations have been disturbed by the processes and instructions given to other system components as described further herein. For example, the MPP tracking operation of an MPPT device may travel discontinuously (jump) on the curve 310 due to an abrupt disturbance induced by the instruction from the MMU in the system (e.g., restarting an LMU or the inverter), and thereafter may restart searching on the curve 310 at a different point on the curve that may in the neighborhood of the ideal MPP 305. In some instances, the disturbance to the system or its components will induce a random placement of the MPP tracking function along the curve 310 and the normal MPP tracking function will settle on the ideal MPP 305 (e.g., when the starting point is near the ideal MPP 305).

Figure 4:
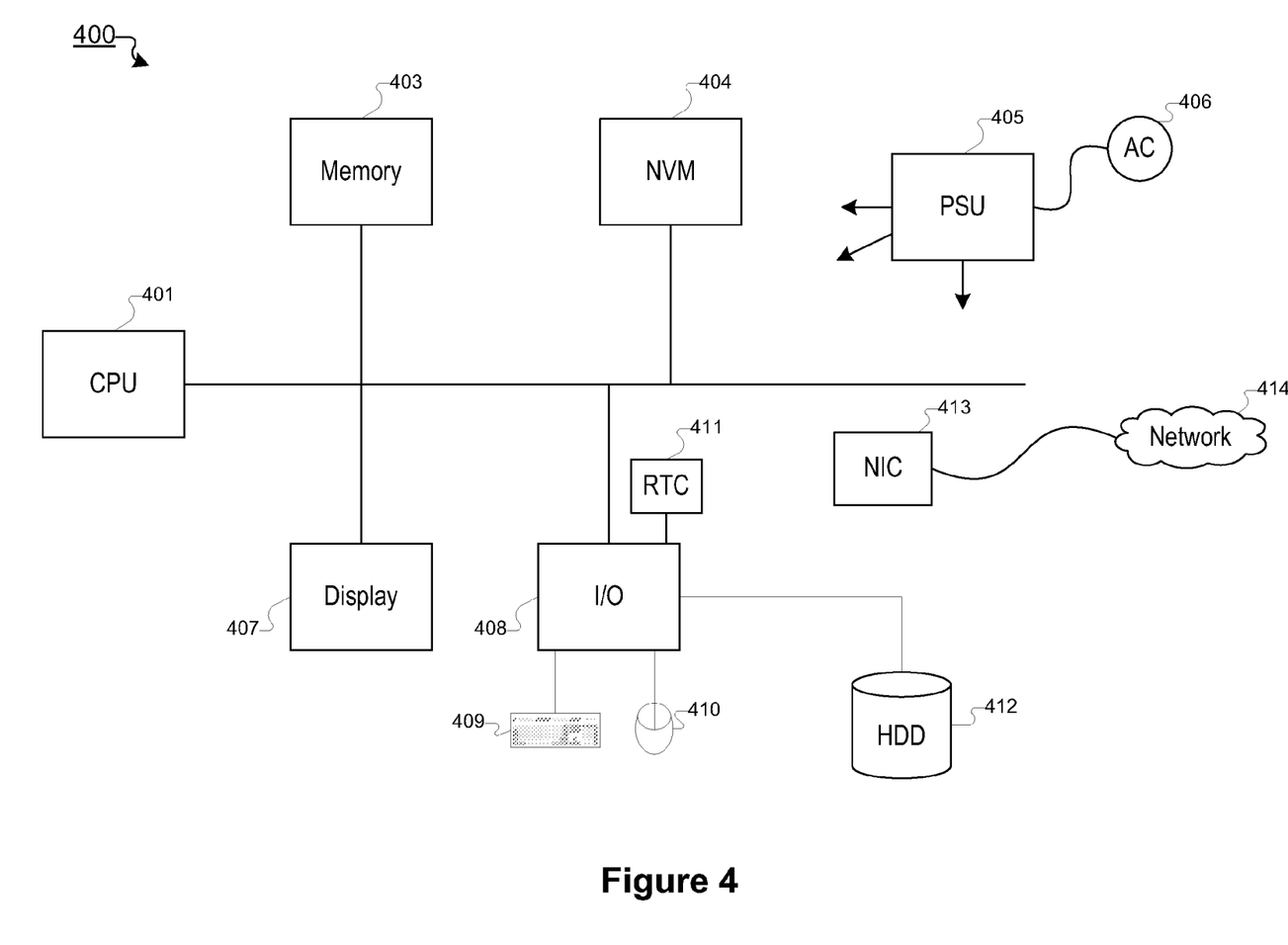
FIG. 4 shows an exemplary controller system that may be used to process data in a SPVPG system, according to an embodiment of the present disclosure.

FIG. 4 shows an exemplary controller system 400 that may be used to process data in a SPVPG system, according to an embodiment of the present disclosure. Controller system 400 may be used in an MMU 120 (from FIG. 1) to process data or to manage/control the operation of the various components in SPVPG system 100. Controller system 400 includes CPU 401, memory 403, nonvolatile memory 404, power supply unit 405, AC supply 406, display 407, I/O unit 408, keyboard 409, pointing device 410, real-time clock 411, hard disk drive 412, network interface card (NIC) 413, and network 414. Bus 402 connects to CPU 401, connected memory 403, nonvolatile memory 404, display 407, I/O unit 408, and network interface card (NIC) 413. I/O unit 408 may be connected to keyboard 409, pointing device 410, hard disk drive 412, and real-time clock 411. NIC 413 may connect to network 414, which may be the Internet or a local network, and the local network may or may not have connections to the Internet. The network may also be a wired network, power-line network, radio, wireless, 802.11 network, infrared network, ultrasound network, etc. Also shown as part of the controller system 400 is power supply unit 405 connected to AC supply 406. The arrows leading out of power supply unit 405 may be connected to other components within the controller system 400. In one embodiment, batteries and/or other energy sources may be shown as powering the various components of controller system 400 in addition to, or in place of, power supply unit 405. Many other devices and modifications that are well known may be used instead of, or in addition to, the components shown of controller system 400, without departing from the broader spirit and scope of the system and method disclosed herein.

The performance of solar modules or of inverters within solar modules can vary significantly with temperature. A system capable of measuring temperature can implement methods for controlling the voltage, power output, or the efficiency of one or more strings of solar module controllers using module temperature as a factor. For example, a formula presented by Nalin K. Gautam and N. D. Kaushika in "An efficient algorithm to simulate the electrical performance of solar photovoltaic arrays," *Energy*, Volume 27, Issue 4, April 2002, pages 347-261, can be used to compute the voltage of a solar module at the maximum power point. Other formulae can also be used. In one embodiment, the MMU may use the formula to determine operation parameters of the LMUs and/or to determine whether the MPPT device of an inverter is operating its associated photovoltaic system in a sub-optimal state.

It is clear that many modifications and variations of this embodiment can be made by one skilled in the art without departing from the spirit of the novel art of this disclosure. For example, the systems and method herein disclosed can be applied to energy generating systems besides solar photovoltaics (e.g., windmills, water turbines, hydrogen fuel cells, to name a few). Also, while specific voltage values and thresholds may have been disclosed, other reference points for the target voltage can also be used. These modifications and variations do not depart from the broader spirit and scope of the present disclosure, and the examples cited here are illustrative rather than limiting.

What is claimed is:
1. A method comprising:
receiving first power output information from a maximum power point tracking (MPPT) device configured to track a maximum power point of a solar power production system; wherein the solar power production system contains a plurality of direct current (DC) to DC converting devices each connected with at least one of a plurality of solar panel units within the solar power production system;

making a determination, from the first power output information, that maximum power point tracking performed by the MPPT device on the solar power production system has been trapped at a first state of operating the solar power production system for a predetermined period of time, the first state being sub-optimal for the solar power production system; and based on the determination, transmitting a first instruction to a first device, selected from the group consisting of the MPPT device and the plurality of DC to DC converting devices, to change a control operation of the first device.

2. The method of claim 1, wherein the first device is the MPPT device.

3. The method of claim 1, wherein the first device is one of the DC to DC converting devices.

4. The method of claim 3, wherein the first device includes a management unit configured to connect a solar panel unit of the solar power production system to the MPPT device.

5. The method of claim 4, wherein the management unit performs maximum power point (MPP) tracking for the solar panel unit.

6. The method of claim 4, further comprising:
receiving measurement data from the management unit; and
wherein the determination is further based on the measurement data.

7. The method of claim 1, further comprising:
receiving second power output information from a second MPPT device configured to track a maximum power point of a separate solar power production system; and
wherein the determination is based on comparing the first power output information and the second power output information.

8. The method of claim 1, wherein the first instruction is to restart the first device.

9. The method of claim 1, wherein the MPPT device is integrated in an inverter; wherein the inverter is adapted to convert electricity generated by the plurality of solar panel units of the solar power production system from DC to alternating current (AC).

10. The method of claim 1, wherein the first instruction is to operate temporarily at least one solar panel unit in a third state that is less optimal than the first state.

11. The method of claim 1, wherein the first instruction is to shut down the MPPT device.

12. The method of claim 1, wherein each respective solar panel unit of the plurality of solar panel units has a local management unit comprising:
a circuit to measure operating parameters of the respective solar panel unit;
a communicator to transmit the operating parameters and to receive instructions; and
a converter coupled to the respective solar panel to output electricity generated by the respective solar panel, the converter being one of the plurality of DC to DC converting devices;
wherein the method further comprises:
receiving operating parameters transmitted from the communicator of the local management unit of the each respective solar panel unit of the plurality of solar panel units;
computing control parameters for the converter of the local management unit of the each respective solar panel unit of the plurality of solar panel units based on the operating parameters received from the communicator of the local management unit of the each respective solar panel unit of the plurality of solar panel units; and
transmitting the control parameters to the communicator of the local management unit of the each respective solar panel unit of the plurality of solar panel units to control the converter of the local management unit of the each respective solar panel unit of the plurality of solar panel units.

13. A solar photovoltaic power generation system, comprising:
a plurality of photovoltaic panels;
a plurality of direct current (DC) to DC converting devices each configured to adjust an output of a corresponding panel of the plurality of photovoltaic panels;
a maximum power point tracking (MPPT) device adapted to control the plurality of photovoltaic panels;
a master management unit (MMU) adapted to:
receive information about a power output of the plurality of photovoltaic panels,
make a determination, based on the information, that maximum power point tracking performed by the MPPT device on the plurality of photovoltaic panels has been trapped in a sub-optimal state of operating the plurality of photovoltaic panels for a period of time, and
instruct a first device, selected from the group consisting of the MPPT device and the DC to DC converting devices to change a control operation of the first device, based on the determination about the MPPT device.

14. The solar photovoltaic power generation system of claim 13, wherein the MMU is further adapted to instruct the first device to restart, based on the determination about the MPPT device.

15. The solar photovoltaic power generation system of claim 13, wherein the first device is one of the DC to DC converting devices.

16. The solar photovoltaic power generation system of claim 15, wherein the DC to DC converting devices connect the plurality of photovoltaic panels into one or more strings.

17. The solar photovoltaic power generation system of claim 13, further comprising:
a plurality of local management units each containing a corresponding one of the direct current (DC) to DC converting devices and adapted to communicate information about a power output of the corresponding panel to the MMU.

18. An apparatus adapted to control a solar power production system, the apparatus comprising:
a memory to store a first executable program;
a microprocessor to execute the first executable program; and
a communications device coupled to the microprocessor to receive first power output information from a maximum power point tracking (MPPT) device configured to track a maximum power point of the solar power production system;
wherein the solar power production system contains a plurality of direct current (DC) to DC converting devices each connected with at least one of a plurality of solar panel units within the solar power production system;
wherein the microprocessor is adapted to make a determination in accordance with the first executable program, from the first power output information, that maximum power point tracking performed by the MPPT device on the solar power production system has been trapped at a first state of operating the solar power production system for a predetermined period of time, the first state being sub-optimal for the solar power production system; and wherein the communications device is adapted to transmit, in response to the determination, a first instruction to a first device, selected from the plurality of DC to DC converting devices, to change a control operation of the first device.

19. The apparatus of claim 18, wherein the first instruction is to operate temporarily at least one solar panel unit in a third state that is less optimal than the first state.

20. The apparatus of claim 18, wherein the communications device is further adapted to receive second power output information from a second MPPT device configured to track a maximum power point of a separate solar power production system; and wherein the determination is based on comparing the first power output information and the second power output information.

* * * * *